United States Patent [19]

Hankammer

[11] Patent Number: 4,666,600

[45] Date of Patent: May 19, 1987

[54] INSERT FOR A WATER PURIFIER

[75] Inventor: Heinz Hankammer, Taunusstein, Fed. Rep. of Germany

[73] Assignee: Brita Wasserfilter GmbH, Taunusstein, Fed. Rep. of Germany

[21] Appl. No.: 892,886

[22] Filed: Jul. 29, 1986

Related U.S. Application Data

[63] Continuation of Ser. No. 712,390, Mar. 15, 1985, abandoned.

[30] Foreign Application Priority Data

Mar. 17, 1984 [DE] Fed. Rep. of Germany ....... 3409828

[51] Int. Cl.$^4$ .................. B01D 27/02; B01D 27/08
[52] U.S. Cl. .................. 210/266; 210/282; 210/289; 210/477
[58] Field of Search ............... 210/694, 764, 266, 282, 210/285, 286, 287, 289, 290, 291, 315, 316, 314, 317, 318, 456, 502.1

[56] References Cited

U.S. PATENT DOCUMENTS

| | | | |
|---|---|---|---|
| 3,705,651 | 12/1972 | Klein | 210/282 |
| 3,747,767 | 7/1973 | Hankammer | 210/282 |
| 3,780,867 | 12/1973 | Zirlis | 210/282 |
| 4,062,205 | 12/1977 | Morey | 210/282 |
| 4,212,743 | 7/1980 | Van Meter | 210/282 |
| 4,306,971 | 12/1981 | Hankammer | 210/282 |
| 4,309,992 | 1/1982 | Dodak | 210/282 |

FOREIGN PATENT DOCUMENTS 2535848  2/1977  Fed. Rep. of Germany ...... 210/282

Primary Examiner—Ernest G. Therkorn
Attorney, Agent, or Firm—Donald C. Studley; Michael L. Dunn

[57] ABSTRACT

Described is an insert for a water purifier comprising substantially cylindrical side walls (9) with a filter top (16) and a filter bottom (10) at the end thereof, and with an annular sealing means (12, 22) secured to the upper end of the side walls (9).

In order to increase the volume and in particular the length of the flow path of the liquid to be purified, through the purification agent, it is provided in accordance with the invention that the insert comprises a distributor and a cup portion (11) connected thereto, which respectively have at least a guide tube (13, 17) extending into the interior of the insert and an annular flange (12) for securing to the other annular flange (22), that the guide tubes (13, 17) are of different diameters and in the assembled condition are in concentric relationship with each other, that the upper annular flange (22) is secured to the filter top (16) of the distributor, said filter top having an end wall (21) and filter slots (23) in a cylindrical wall (20), an that filter means are provided at the inner guide tube (13).

9 Claims, 9 Drawing Figures

INSERT FOR A WATER PURIFIER

This application is a continuation of application Ser. No. 712,390, filed Mar. 15, 1985, now abandoned.

The invention relates to an insert for a water purifier comprising substantially cylindrical side walls with, at the ends thereof, a filter top and a filter bottom and with an annular sealing means which is secured to the upper end of the side walls.

German laid-open application (DE-OS) No. 29 19 901 discloses a water purifier of the kind set forth in the opening part of this specification. In that purifier, an insert is releasably connected to a hopper or funnel-like portion, while filter-like closure members are disposed at the two mutually oppositely disposed ends of the insert. It has been found in the past in earlier inserts that the filter-like openings which are provided in the horizontal plane, in particular the upper filter means of the insert, suffered from wetting or partial clogging with the result that the flow of water through the space which was defined by the filter members and which was filled with purifying agent was considerably slowed down or interfered with. Therefore, in the water purifier disclosed in the above-mentioned DE-OS, disposed at the upper end of the insert is an upwardly projecting vent tube which is provided with openings at its top. The vent tube may also be formed in the manner of a handle in order to enhance handling of the upper filter member. The openings at the top of the vent tube are disposed above the level of liquid so that there is then no longer any clogging of the upper filter, with the result of interfering with the flow of water through the arrangement. Thus, the liquid to be purified, generally water, can flow through the filter members and the insert more easily.

The aim of the present invention is to achieve further improvements in regard to the insert of the water purifier.

To improve an insert of the kind set forth in the opening part of this specification, the object of the present invention is to increase the volume and in particular the length of the flow path of the liquid to be purified, through the purification agent. In that connection, it would be desirable if the upwardly projecting vent tube of the known insert could be omitted.

In accordance with the invention, to provide such an insert and to attain the above-indicated object, it is provided that the insert comprises a distributor and a cup portion connected thereto, which respectively have at least a guide tube extending into the interior of the insert and an annular flange for securing to the other annular flange, that the guide tubes are of unequal diameter and are arranged concentrically relative to each other in the assembled condition, that the upper annular flange is secured to the filter top of the distributor, said filter top having an end wall and filter slots in a cylindrical wall, and that filter means are provided at the inner guide tube. The insert according to the invention no longer comprises, like the above-described known water purifier, a simple cup which is closed at top and bottom by filter or sieve members in such a way that the purification agent is retained by the filter slots, but instead the novel insert comprises two specially formed components, namely the component referred to as the distributor and the component referred to as the cup portion. Each of those two components has a guide tube which extends into the interior of the insert. The guide tubes are of different diameters and are disposed in concentric relationship when they are in the assembled condition. In order to seal off the insert relative to the exterior, the distributor and the cup portion each carry an annular flange, which flanges can be secured together, and can preferably be sealed. Arranged on the distributor at the top thereof is a filter or sieve top member and arranged thereon is the upper annular flange. The filter top itself has a cylindrical wall with filter slots, and an end wall. Besides the filter means on the top of the filter top, there is a filter means on the inner guide tube.

Advantageously, the two guide tubes which project into the interior of the insert and which are arranged concentrically are provided in the manner of flow chicanes. In other words, that enlarges the flow path of the liquid to be purified, by a multiple, in comparison with the height of the whole insert.

The purification agent comprises for example a granulate or also activated carbon. Preferably, a suitable purification agent for water for industrial use is an activated carbon which is made substantially germ-free by a surface treatment, for example by silver plating the surface thereof. However, it is also possible to use other granulates such as for example ion exchangers and the like.

When the insert is connected to a funnel-like portion of the water purifier, it will be apparent to the final user that the fresh water which is poured into the funnel-like portion at the top is to flow through the sleeve and thus the purification agent. Although the flow speed may not be excessive, it is understandably undesirable for the flow to be impeded by blocked filters or sieves.

The interchangeability of the whole insert together with the purification agent has the advantage that the final user does not need to come into contact with the purification agent and therefore germs cannot get into the loose grains. That provides for maximum hygiene, in particular avoiding undesirable infection. For that purpose however, it must be possible for the insert filled with the purification agent to be fitted as a unit into a per se known funnel portion and to be removed therefrom after the purification action has become exhausted, to be replaced by a new insert which is filled with fresh purification agent.

Although the known insert whose flow path was equal to the height of the insert itself provided really good results, the effect is considerably enhanced by the multiple increase in the distance which has to be covered by the water to be purified in flowing through the purification agent.

The novel insert does not have the upwardly projecting vent tube of the known insert. Instead, the novel insert according to the invention has a filter or sieve top or cover of a particular configuration, more specifically, it has an end wall which in the position of use is disposed in a horizontal plane and a cylindrical wall which adjoins the edge of the end wall in a downward direction. The above-mentioned filter slots are to be found in the cylindrical wall and possibly in part also in the end wall. When, in the manner described above, the annular flange on the filter top is arranged at the lower end of the cylindrical wall which has the slots therein, and is in direct contact with the other annular flange which is disposed at the upper end of the cup portion, then to avoid clogging of the filter slots, it is possible to provide that only a small part or none of the liquid penetrates into the space in the filter top, in use of the arrangement. In other words, the space in the filter top between the end wall thereof and the upper annular flange is filled with air, and any liquid which gets in will initially enter in the lower region of the slots so that the air can escape in the upper region thereof, consequently eliminating clogging or flooding thereof.

The annular flanges and in particular the lower annular flange which is mounted to the cup portion serves at the same time as a sealing means between the funnel-like portion which in use is filled with liquid and the insert or the collecting container which is disposed beneath the funnel member. Although that arrangement does not provide an absolute seal for the annular flanges are only laid on the central opening in the funnel-like portion, practical experience has shown however that the sealing action which is achieved in that way is fully sufficient so that the liquid in the funnel portion can only reach the collecting container by flowing through the insert and the purification agent.

It is advantageous in accordance with the invention if the filter or sieve means are arranged at the top and/or bottom on the inner guide tube. It will generally be preferred for the filter means to be disposed on the inner guide tube at the bottom thereof. That gives an increase in volume for the filter material. The filter material or the purification agent is disposed, as already mentioned, in and around the guide tubes in the region of the cup portion. In that way, the arrangement provides a flow path for the liquid, which first passes into the filter cover in the top part outside the outer guide tube which is mounted to the distributor, and flows downwardly on the outside wall of the outer guide tube, in the entire annular space between the outer guide tube and the outer wall of the cup portion. After that preliminary purification operation, the direction of flow is turned through 180° at the lower end of the outer guide tube and the liquid now flows outside the inner guide tube and inside the outer guide tube into the annular space which is formed between the two guide tubes, upwardly to the end of the inner guide tube, where the direction of flow again changes through about 180° so that the liquid can finally flow downwardly through the inner guide tube, and can be discharged thereat.

If now the filter or sieve means are arranged on the inner guide tube at the bottom thereof, it will be apparent that purification agent is also available, in the space within the inner guide tube, over the last-described third of the flow path of the liquid which is to be purified.

However, it may also be desirable if, in accordance with the invention, the filter or sieve means has straight filter slots which are arranged in an annular array at the upper end of the inner guide tube which is closed at its top. In that case, the liquid distribution effect is improved for the liquid or water which flows up on the outside of the inner guide tube cannot then, as in the last-described case, flow over the edge and flow through paths that it seeks out itself, down into the space within the inner guide tube, but instead the liquid to be purified must flow through the slots at the upper end of the inner guide tube. The annular distribution of the preferably straight slots permits the incoming flow of water or liquid to be made uniform.

However, the possibility can also be envisaged that a filter or sieve means is disposed on the inner guide tube both at the top and at the bottom, for example being, at the top, the annular array of straight filter slots and at the bottom another kind of filter or sieve member. In that case, a different purification agent may be used in the interior of the guide tube, from that outside. In other words, that arrangement permits different filter agents to be disposed separately in the insert. If for example only the inner guide tube is filled in a first filling operation, then, in a second filling operation, the double annular space outside the inner guide tube, which has already been filled, and inside the outside wall of the cup portion, can be filled with the other material.

In another advantageous embodiment of the invention, the slots in the filter top are straight and arranged in an annular array, and preferably the slots in the filter bottom are curved and are arranged on concentric circular lines. While previously reference was made to the filter means on the inner guide tube, the filter slots on the filter top or cover are now being discussed. They may also be of a straight configuration and arranged in an annular array. The shape of the filter top with end wall and cylindrical side wall which extends from the end wall to the upper annular flange has already been discussed. It is preferable for the straight slots to be arranged in the cylindrical wall, the direction of the straight slots coinciding with the longitudinal axis of the cylindrical wall. However, the direction may also be turned through 90° so that the slots extend on circular lines at the periphery of the cylindrical wall. Less desirable is the arrangement of slots in the end wall alone because in that case the problem of clogging and flow restriction occurs again. The combination of short straight slots projecting inwardly from the edge, in the end wall of the filter top, with slots in the cylindrical wall, has been found to be advantageous.

The invention further provides that the outer guide tube is fixed to the filter top. In regard to the above-described liquid flow path, it was already assumed that that feature was to be found therein, but it is not absolutely necessary. By virtue of mounting the outer guide tube to the filter top, the liquid to be purified, which enters from above through the slots in the filter top, is first obliged to flow downwardly into the annular space between the outer guide tube and the outside wall of the cup portion.

In addition, the cup may then be easily filled from above. On the assumption that either the filter means are arranged at the lower end of the guide tube or, (if they are arranged at the top and the inner guide tube is already filled with another purification agent), the operation of filling the cup portion from above as far as the edge, that is to say, up to the level of the lower edge flange, requires less attention to be paid thereto. In that case, the distributor with the outer guide tube is inserted from above, fitted into position and connected by ultrasonic welding, that is to say, the upper and lower annular flanges are sealingly joined together by ultrasonic welding. The use of adhesive is not preferred when operating in the foodstuffs field (drinking water).

It is also desirable in accordance with the invention if the length of the two guide tubes is approximately equal and if the length of the inner guide tube is equal to the height of the side wall of the cup portion. That arrangement not only favours the above-described advantageous method of filling the cup portion, but, due to the length of the inner guide tube, it also ensures that the annular space in the filter top is not filled with purification agent and therefore preferably remains filled with air so that the flow through the slots in the filter top is maintained without impediment.

BRIEF OF DESCRIPTION OF THE DRAWINGS

Further advantages, features and possible uses of the present invention will be apparent from the following description of preferred embodiments in conjunction with the drawings in which.

DESCRIPTION OF THE PREFERRED EMBODIMENTS

Figure 1:
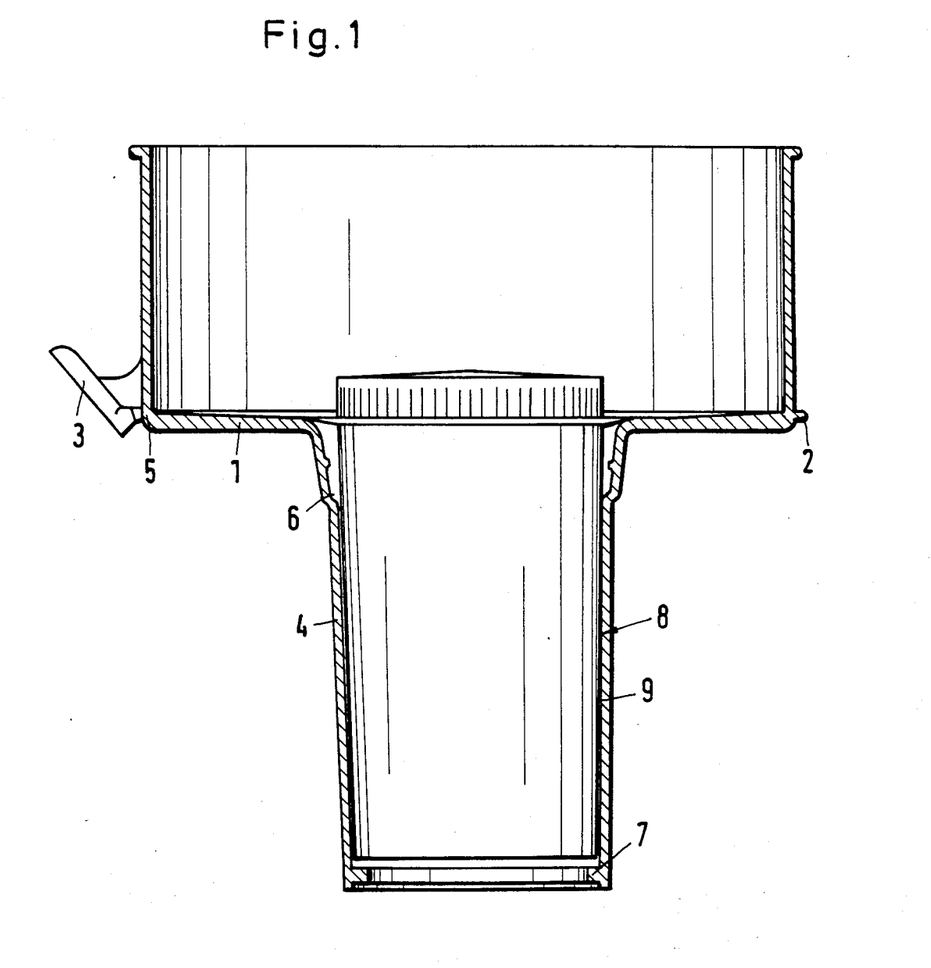
FIG. 1 is a view in cross-section through a water purifier according to the invention, with a cartridge-like insert which is fitted into the sleeve of the funnel-like portion of the purifier.
Figure 2:
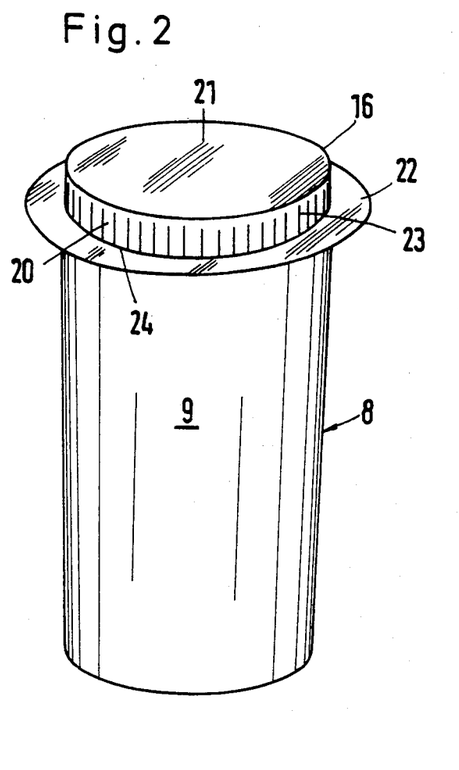
FIG. 2 is a perspective view of the insert according to the invention.

FIG. 1 shows the entire apparatus for the purification of liquid, preferably water, comprising a funnel-like portion 1 and a sleeve 4 which is integrally formed thereon on the underside thereof. Provided on the outer lower edge of the portion 1 is a flange 2 for bearing against the edge of a container (not shown). Formed on the funnel portion 1 at one side, being the side on the left in FIG. 1, is an inclinedly disposed side plate or bar 3 which, upon actuation thereof, permits the portion 1 with the sleeve 4 formed integrally thereon to be pivoted upwardly about the pivot point indicated approximately at 5 by the cross. By virtue of that arrangement, the liquid which has already been purified can be poured out directly with the funnel portion 1 still fitted on the pouring container (not shown).

At the top, at its transition to the portion 1, the sleeve 4 which is formed integrally on the underside of the portion 1 at the centre thereof is provided with a support step 6, by virtue of an enlargement in its configuration. However, the annular enlargement is not absolutely necessary, but is suitable for the use of earlier inserts and does not interfere with the use of the insert according to the invention.

In the embodiment illustrated herein, the sleeve 4 is of such a configuration as to be slightly conically tapering in a downward direction. At its lower end, it has a short, horizontally inwardly projecting edge or rim 7 which projects inwardly by a few millimeters on the inside of the wall of the sleeve 4, in order to provide a support means which extends around the interior of the entire periphery of the sleeve. The support means could also be formed by individual projections or by a cross-shaped support surface.

The cup-shaped insert 8 is to be fitted into the sleeve 4.

Figure 5:
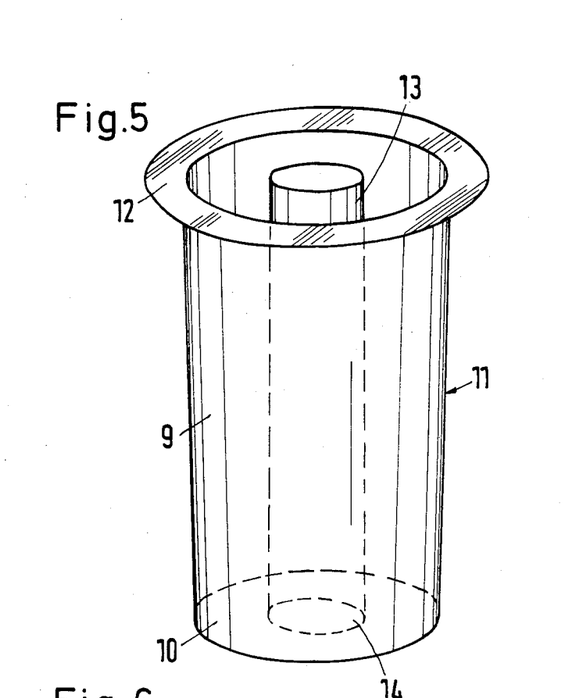
FIG. 5 is a perspective view of the cup portion with lower annular flange and inner guide tube.
Figure 9:
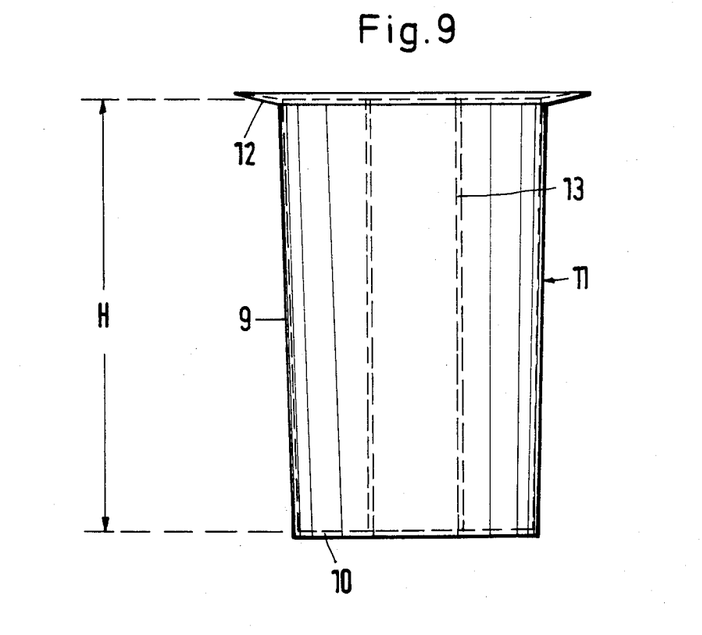
FIG. 9 is a similar view to FIGS. 7 and 8 showing the cup portion with the inner guide tube and the lower annular flange.

The insert 8 comprises the cup portion 11 which in turn comprises the approximately cylindrical outside walls 9, the filter or sieve bottom 10, the lower annular flange 12 and the inner guide tube 13. In this arrangement, in accordance with the construction shown in FIG. 5, the bottom 10 comprises an annular wall which is impervious to fluid and the circular sieve or filter member 14 which is disposed at the bottom centrally in the region of the inner guide tube 13. The member 14 may comprise for example plastics material and may have curved filter slots which are arranged on concentric circular lines. As shown in FIGS. 5 and 9, the inner guide tube 13 is of the same length as the height H (see FIG. 9) of the side wall 9 of the cup portion 11.

The insert 8 further comprises the distributor which is generally denoted by reference numeral 15. In its upper portion, it comprises the filter or sieve top 16 and the outer guide tube 17 which is mounted thereto and which extends into the interior of the insert 8. The guide tube 17 is open at its lower edge 18. In the construction shown in FIG. 5, the inner guide tube 13 is also open at its top, but in the construction shown in FIG. 6 the inner guide tube 13 is closed at its top by the top or cover 19. The inner guide tube 13 is also to be assumed to be open at its top in all other Figures of drawing, including in FIG. 3, apart from in FIG. 6.

Figures 3, 4:
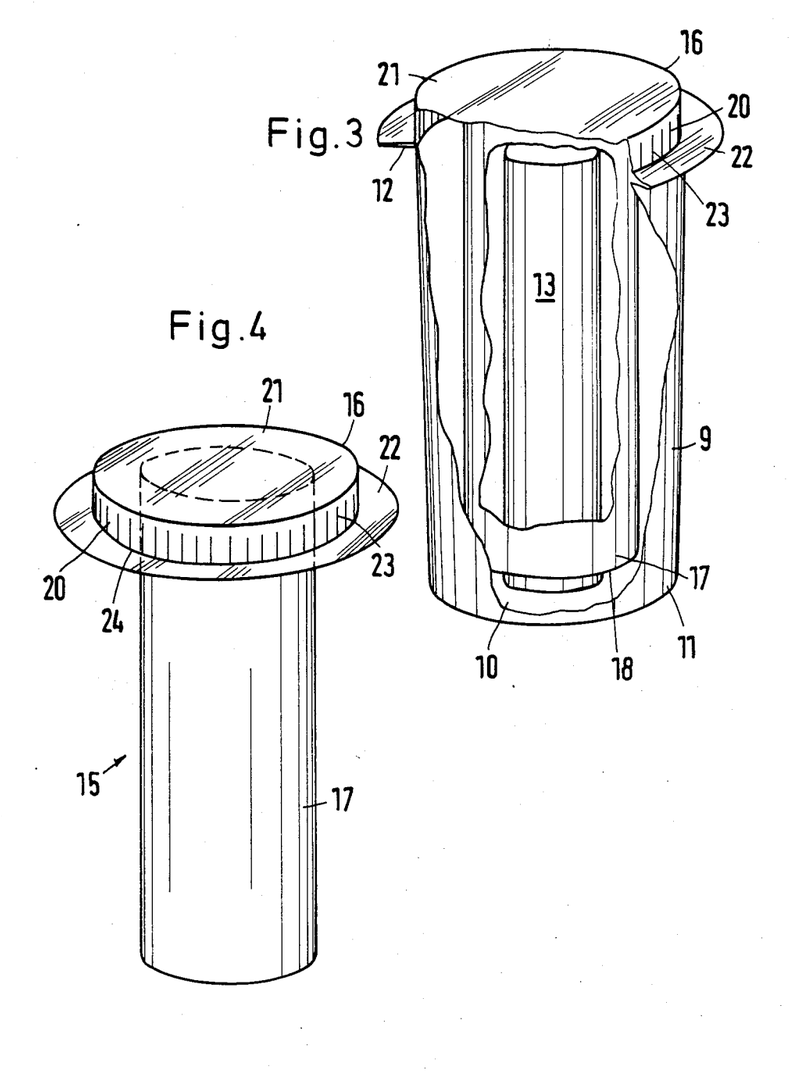
FIG. 3 is a partly broken-away view of the insert to show the construction thereof with the individual guide tubes and walls.
FIG. 4 is a perspective view of the distributor with filter top and outer guide tube.
Figure 7:
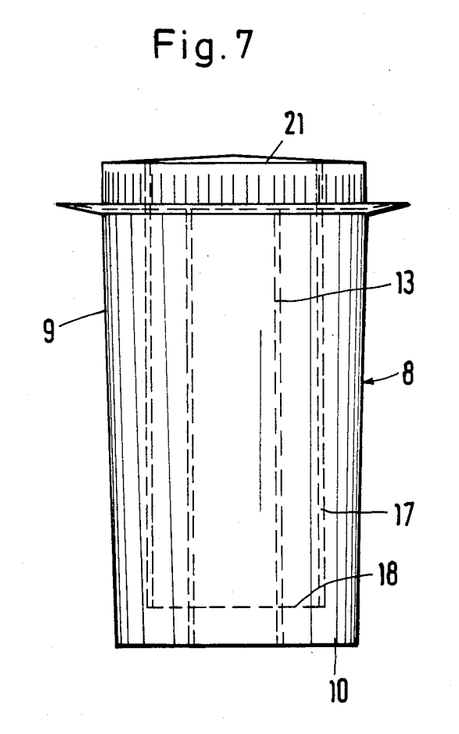
FIG. 7 is a side view of the entire insert as shown in FIG. 2, wherein however the inside walls are diagrammatically indicated in broken lines.

In the assembled condition, in particular in the views shown in FIGS. 3 and 7, it will be seen that the guide tubes 13 and 17 are of different diameters and are arranged in concentric relationship with each other.

Figure 8:
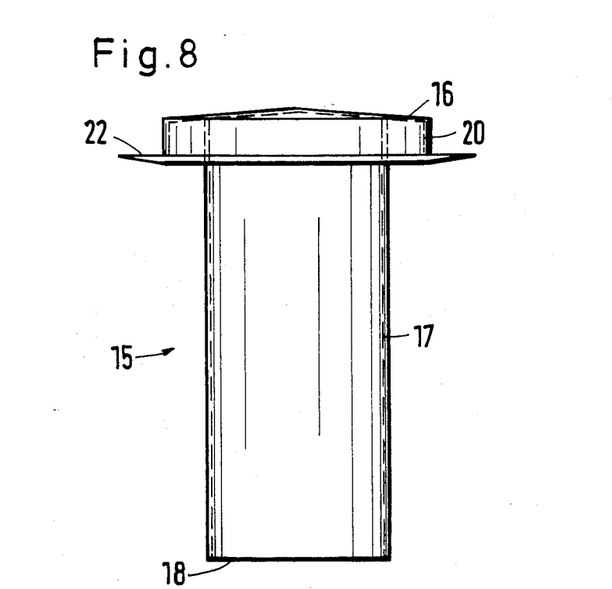
FIG. 8 is a similar view to FIG. 7 showing the distributor with filter top and outer guide tube.

The top or cover 16 comprises a cylindrical wall 20 which is closed upwardly by a preferably flat end wall 21. Mounted on the side of the cylindrical wall 20 which is in opposite relationship to the end wall 21 is a radially outwardly extending upper annular flange 22 which, as shown in FIG. 8, is bevelled or inclined somewhat downwardly so that it matches the similarly bevelled or inclined lower annular flange 12 which, in the view shown in FIG. 1, bears sealingly on the bottom of the portion 1.

After the components have been assembled, the two flanges 12 and 22 are sealingly joined together in the region of their annular surfaces by ultrasonic welding.

The insert 8 in accordance with the invention has three, or at least two, different sieve or filter means.

1. The first filter means 14 is disposed in the filter bottom 10, as can be seen for example from FIG. 5.

2. The second filter means is disposed in the top or cover 16 and comprises straight filter slots 23 which are disposed in an annular array. The direction of the slots 23 is parallel to the axial direction of the larger and inner guide tubes 17 and 13; as shown in FIG. 4, they begin at the inner edge 24 of the upper annular flange 22 and preferably terminate at a spacing from the circular periphery of the upper end wall 21. In another embodiment (not shown), the slots 23 may also extend as far as the circular edge of the end wall 21 while in another third embodiment they may preferably even extend by a portion radially from the outer periphery of the end wall 21 towards the centre point thereof, but only over about 1 to 3 millimeters. Preferred however is the embodiment which is shown in FIG. 4.

Figure 6:
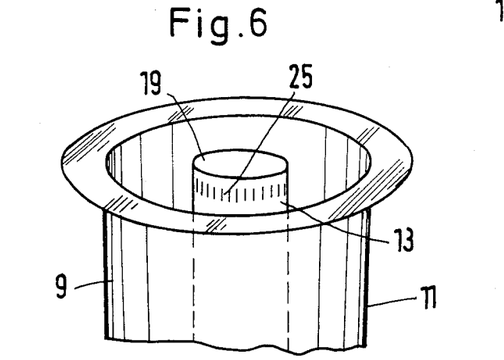
FIG. 6 is a similar view to FIG. 5, only showing the upper portion in broken-away form, except in another embodiment with an upwardly closed inner guide tube.

3. A third filter means 25 is provided at the upper end of the inner guide tube 13 which, in the embodiment shown in FIG. 6, is closed at its top by the wall portion 19. That filter means 25 comprises straight filter slots which are disposed in a peripheral annular array. It is also possible here to envisage filter slots of a different configuration, and possibly also rows of holes, although this only ever concerns the construction shown in FIG. 6 wherein the inner guide tube 13 is closed upwardly by the wall portion 19. In this case, the lower circular filter member 14, as shown in FIG. 5, may be omitted or additionally provided.

Therefore, the insert 8 in accordance with the invention is provided at least with two sieve or filter means 14 and 23, and possibly also with the sieve or filter means 25, or, with the lower filter means 14 being omitted, with the upper filter means 25 on the inner guide tube 13 only instead of the lower filter means 14.

I claim:

1. A substantially cylindrical insert for a gravity operated water purifier comprising:
   (a) an outside casing having a sidewall, a top portion and a bottom,
   (b) a guide tube within said casing and secured to said bottom,
   (c) an exit opening in said bottom connected with the interior of said guide tube,
   (d) at least one filter means connected with said guide tube positioned to filter liquid flow therethrough,
   (e) a distributor positioned atop said casing enclosing the top portion thereof,
   (f) said distributor having a guide tube extending downwardly within said casing and spacedly positioned from said casing bottom,
   (g) said guide tube on said distributor forming a first annular space between the outside of said guide tube and the inside of said casing, and a second annular space between the inside of said guide tube and the outside of the guide tube attached to the casing bottom,
   (h) said distributor being imperforate except having plurality of annularly arranged entrance openings enabling the gravitational flow if a plurality of liquid streams from the outside of said distributor to the top portion of said annular space,
   (i) said annular spaces containing granular purification agent, and
   (j) said casing and said distributor having outwardly extending flanges engageable to form a sealed unit.

2. The insert of claim 1 wherein said guide tube secured to said casing has a filter means positioned at the top portion thereof.

3. The insert of claim 1 wherein said guide tube secured to said casing has a filter means positioned in the bottom portion thereof.

4. The insert of claim 1 wherein the filter means are a plurality of slots.

5. The insert of claim 1 wherein said guide tubes are substantially the same length and the length of said guide tube attached to said casing is substantially equal to the height of said casing.

6. The insert of claim 1 wherein said plurality entrance openings in said distributor are of slots.

7. The insert of claim 1 wherein said plurality of entrance openings in said distributor are straight slots arranged in an annular array.

8. The insert of claim 1 wherein at least one of said filter means is a plurality of curved slots concentrically arranged.

9. The insert of claim 1 wherein the guide tube attached to the bottom of said casing has a closed top.

* * * * *